United States Patent [19]
Pint et al.

[11] Patent Number: 5,528,907
[45] Date of Patent: Jun. 25, 1996

[54] METHOD AND APPARATUS FOR AUTOMATICALLY PRODUCING A SMALL BLOCK OF SOLID CARBON DIOXIDE

[76] Inventors: Kenneth R. Pint, 995 Hunters Ridge, Jasper, Ga. 30143; Martin S. Taylor, Lake Arrowhead Station 1083, Waleska, Ga. 30183; Jagat N. Trivedi, 1846 Kristen Mill Ct., Marietta, Ga. 30062

[21] Appl. No.: 225,708

[22] Filed: Apr. 11, 1994

[51] Int. Cl.$^6$ ...................................................... B29C 43/00
[52] U.S. Cl. ............................................... 62/604; 62/341
[58] Field of Search ......................................... 62/35, 341

[56] References Cited

U.S. PATENT DOCUMENTS

| | | | |
|---|---|---|---|
| 1,620,993 | 3/1927 | Burns et al. | 62/35 |
| 1,768,059 | 6/1930 | Hassensall | 62/35 |
| 2,016,815 | 10/1935 | Gilmore | 62/35 |
| 2,062,971 | 12/1936 | Eichmann | 62/35 |
| 2,738,658 | 3/1956 | Bronson | 62/35 |
| 3,576,112 | 4/1971 | Frost et al. | 62/35 |
| 3,835,657 | 9/1974 | Scudder | 62/35 |
| 3,901,044 | 8/1975 | Vahl | 62/35 |
| 3,922,878 | 12/1975 | Jalali | 62/35 |
| 3,952,530 | 4/1976 | Tyree, Jr. | 62/35 |
| 4,374,658 | 2/1983 | Kawaguchi | 62/35 |
| 4,377,402 | 3/1983 | Crowe et al. | 62/35 |
| 4,412,852 | 11/1983 | Umino et al. | 62/35 |
| 4,753,082 | 6/1988 | Sudo et al. | 62/35 |
| 4,770,684 | 2/1988 | Tsukuda et al. | 62/35 |

*Primary Examiner*—Ronald C. Capossela
*Attorney, Agent, or Firm*—Langen & Langen

[57] ABSTRACT

A new METHOD AND APPARATUS FOR AUTOMATICALLY PRODUCING A SMALL BLOCK OF SOLID CARBON DIOXIDE is disclosed and described. The new method and apparatus is comprised of an electrical solenoid operated liquid fill valve, a dry ice block forming chamber having porous walls and/or lining attached to or forming its walls, a hydraulic cylinder and ram, a hydraulic pump assembly, a dry ice block forming chamber door, an electronic solenoid operated pneumatic valve, a pneumatic cylinder and ram, and a digital electronic microcontroller. A pressurized cryogenic Dewar-type tank containing liquefied carbon dioxide provides the cold carbon dioxide input fluid to this invention.

In operation, liquid carbon dioxide is forced out of the pressurized Dewar-type tank to form carbon dioxide snow, with said snow being deposited into a dry ice block forming chamber having porous walls and/or lining attached to or forming its walls. As the carbon dioxide snow flows into said dry ice forming chamber, carbon dioxide snow and gaseous carbon dioxide are produced. The porous walls of the dry ice block forming chamber allow the gaseous carbon dioxide to pass through its pores and to escape into the surrounding atmosphere while trapping the carbon dioxide snow within the confines of said dry ice forming chamber. After the liquid carbon dioxide has been allowed to flow to deposit carbon dioxide snow in said dry ice forming chamber for a preselected length of time, a hydraulic pump is activated to cause a ram to be forced into one end of the dry ice block forming chamber. The carbon dioxide snow compacting plate, attached to the end of the hydraulic ram, moves through the dry ice block forming chamber and compresses the low density carbon dioxide snow within the forming chamber into a solid block of high density carbon dioxide (dry ice). After the low density carbon dioxide snow has been formed into a high density block of solid carbon dioxide, the hydraulic ram forces the finished product out of the device and into a catch container. The hydraulic ram is then returned to its up-most starting position, and the system is reset to make it ready to make another block of solid carbon dioxide.

2 Claims, 7 Drawing Sheets

METHOD AND APPARATUS FOR AUTOMATICALLY PRODUCING A SMALL BLOCK OF SOLID CARBON DIOXIDE

BACKGROUND OF THE INVENTION

Liquefied carbon dioxide is a very cold cryogenic fluid and is stored in Dewar-type containers under high pressure. When liquefied carbon dioxide is brought into contact with a low surrounding pressure, such as less than 70 psig, the liquid assumes a crystalline form called carbon dioxide snow. With time and the absorption of heat, the carbon dioxide snow sublimates and returns to its normal gaseous state. Because the carbon dioxide snow absorbs large quantities of heat during the sublimation process, it is used in place of ice for cooling substances and/or for keeping a substance in a frozen state. The rate of sublimation for carbon dioxide snow is dependent upon the ambient temperature and pressure surrounding said snow and upon the surface area of the snow which is available for heat absorption. From a theoretical point of view, as the carbon dioxide snow particles become larger and larger the surface area for a given total mass of snow becomes smaller and smaller. Therefore, it becomes desirable to maximize the density of the snow produced in order to minimize the rate of sublimation. Because of this, it has become common practice to collect carbon dioxide snow and to compress that snow into larger blocks of solid material. With the application of sufficient pressure during the compression process a block of nearly 100 per cent solid carbon dioxide can be formed. The purpose of this compression process is to minimize the surface area of the solid carbon dioxide that is available for sublimation while maximizing the density and quantity of compressed solid carbon present thus greatly extending the time required to convert the solid carbon dioxide to its gaseous state.

DESCRIPTION OF THE PRIOR ART

Large, complex, and expensive devices are commercially available for producing large blocks of solid carbon dioxide (dry ice). These devices are much too expensive and complex to operate to be of practical value where only small quantities of dry ice may be required for keeping a product cold or frozen. In addition to machines which produce large solid blocks of carbon dioxide, extrusion machines are also currently available which produce pellet-like pieces of solid carbon dioxide. Although the pellets of solid carbon dioxide produced by these large and expensive extruding devices do not sublimate away quite as rapidly as does carbon dioxide snow, the pellets do have a much greater surface area for a given mass of solid carbon dioxide than a larger block of the material. Therefore, the extruders do not produce a product which is as long lasting and efficient as is a solid block of carbon dioxide. There are substantial losses due to sublimation for all forms of solid carbon dioxide during transportation from the manufacturing site to remote user locations. This major loss and disadvantage is eliminated by this invention which makes it possible to produce small quantities of solid blocks of carbon dioxide, at the user's location, as it is needed.

The process of allowing liquid carbon dioxide to be injected into a space at a pressure lower than 70 psig pressure to produce carbon dioxide snow has been known for many years. Small, manually operated carbon dioxide snow compressing devices have also been in use for some time (see Burns et al, U.S. Pat. No. 1,620,999, and Hassensall, U.S. Pat. No. 1,768,059). Another small, manually operated device (Kawaguchi, U.S. Pat. No. 4,374,658) merely produces and catches low density carbon dioxide snow in a cubic shaped square or rectangular chamber to produce a square or rectangular shaped mass of relatively low density carbon dioxide snow. This last device provides no means for compressing the low density carbon dioxide snow into a high density block of solid carbon dioxide. Each of these simple devices require the operator to assemble and then disassemble the device. In addition some of the devices require the operator to load into the devices or use a separate porous container in which the carbon dioxide snow is caught or compressed by manual operation of the devices. Such manual operation exposes the operator to potentially injury from cold component parts, to physical contact with crystalline carbon dioxide, and to dangerous spills of refrigerated, liquid carbon dioxide. The completely automated, single chamber design of the present invention precludes any chance of the operator being subjected to such dangers. In addition, because our new device is completely automated, the need for a skilled operator to assemble and disassemble the device is completely eliminated.

The present invention relates to a method and device for producing blocks of solid carbon dioxide (dry ice) and more particularly to a small, automatic, and portable device for molding, compressing, and forming a small block of solid carbon dioxide.

SUMMARY OF THE INVENTION

The subject of this patent application, A METHOD AND APPARATUS FOR AUTOMATICALLY PRODUCING A SMALL BLOCK OF SOLID CARBON DIOXIDE comprises an electrical solenoid operated liquid fill valve, a dry ice block forming chamber having porous walls and/or lining attached to its walls of any shape cross-section matching that of the compacting plate, a hydraulic cylinder and ram located at a first end of said chamber, a hydraulic pump assembly, a dry ice block forming chamber door, an electronic solenoid operated pneumatic valve, a pneumatic cylinder and ram, and an electronic microcontroller The dry ice block forming chamber door, located at a second end of said chamber, may slide into place to form a closed dry ice block forming chamber or it may swing into place on a hinge mechanism, or be raised into place by a cam assembly or hydraulic cylinder and ram assembly. A pressurized cryogenic Dewar-type tank containing liquefied carbon dioxide provides the cold carbon dioxide input fluid to this invention.

In operation, said pressurized Dewar-type tank, containing refrigerated liquid carbon dioxide, is fluidly connected by insulated tubing to the input of said electrical solenoid operated liquid fill valve, and the output of said fill valve is fluidly connected by insulated tubing to the input of said dry ice block forming chamber. When electrical power is applied to activate the device, and a start switch is closed by an operator or a coin operated device, said solenoid operated fill valve is energized causing said valve to open. Liquid carbon dioxide is forced out of the pressurized Dewar-type tank at a controlled flow rate, through said connecting tubing, through said fill valve, and into said dry ice block forming and converting chamber having porous walls and/or porous lining forming or attached to its walls. As the liquid carbon dioxide flows into said dry ice forming chamber, the liquid changes through evaporation from its liquid state into carbon dioxide snow and gaseous carbon dioxide. The porous walls and/or lining forming or attached to the walls of the dry ice block forming chamber allows the gaseous carbon dioxide to pass through its pores and to escape into the surrounding atmosphere while, at the same time, trapping the carbon dioxide snow within the confines of said dry ice forming chamber. After the liquid carbon dioxide has been allowed to flow for a pre-selected length of time, a hydraulic pump is activated to deliver hydraulic fluid into a hydraulic cylinder and ram causing the ram to be forced into one end of said dry ice block forming chamber. Alternatively, the ram may be powered b pneumatic force. The second end of said dry ice block forming chamber is sealed and held closed by a chamber door having a gaseous carbon dioxide driven pneumatic cylinder and ram attached to said door. As the carbon dioxide snow compacting plate, attached to the end of the hydraulic ram, moves downward through the dry ice block forming chamber toward said chamber door, the low density carbon dioxide snow, trapped in said dry ice block forming chamber, is compressed into a high density block (in the neighborhood at 97 lbs/ft$^3$) of solid carbon dioxide. When the hydraulic ram reaches the end of its travel, the hydraulic pump is reversed to cause the hydraulic ram and compacting plate to reverse its direction of travel, thus releasing the pressure on the chamber door and the block of dry ice which has been formed in the chamber. At this time, an electrically actuated solenoid operated pneumatic valve is activated to allow the pressurized carbon dioxide gas, contained above the liquid carbon dioxide in the Dewar-type tank, to flow through said pneumatic valve to a pneumatic cylinder and ram which, in turn, opens said chamber door. The hydraulic pump is again activated to force or move the solid block of carbon dioxide out of the dry ice block forming chamber and past the open chamber door. When the solid block of solid carbon dioxide has been expelled from the chamber, the hydraulic pump is again reversed to withdraw the hydraulic ram and compacting plate from the dry ice forming chamber, and the chamber door is closed by said pneumatically driven cylinder and ram. Finally, when the hydraulic ram has been fully returned to its starting position, the entire system is reset to its initial starting conditions. It is an object of this invention to provide a new, novel, and useful method and device to automatically produce small, high density, solid blocks of carbon dioxide.

It is another object of this invention to provide a method and device which will automatically produce small solid blocks of high density carbon dioxide without the need for skilled or specially trained operators.

Yet another object of this invention is to provide a method and device which does not require the operator to come into direct contact with super cold components of the device or to disassemble any portion of the device to gain access to the solid block of carbon dioxide.

Still another object of this invention is to provide a method and device to automatically produce small solid blocks of carbon dioxide upon demand, and which may be coin operated as a vending machine by the general public at grocery stores, fishing piers, and other remote locations where extremely cold solid material would be in demand and used.

Another object of this invention is to provide a method and device to automatically make small blocks of solid carbon dioxide which requires very little maintenance and is low cost in its operation.

Another object of this invention is to provide a method and device to automatically produce small blocks of solid carbon dioxide which is economical and easy to produce.

Yet another object of this invention is to provide a method and device to automatically produce small blocks of carbon dioxide within a single chamber without the need to have a separate snow making chamber and a separate snow compressing chamber.

These objectives and other features and advantages of this invention will become readily apparent upon reference to the following description when taken in conjunction with the accompanying drawings.

DESCRIPTION OF THE PREFERRED EMBODIMENT AND SPECIFICATION

Figure 1:
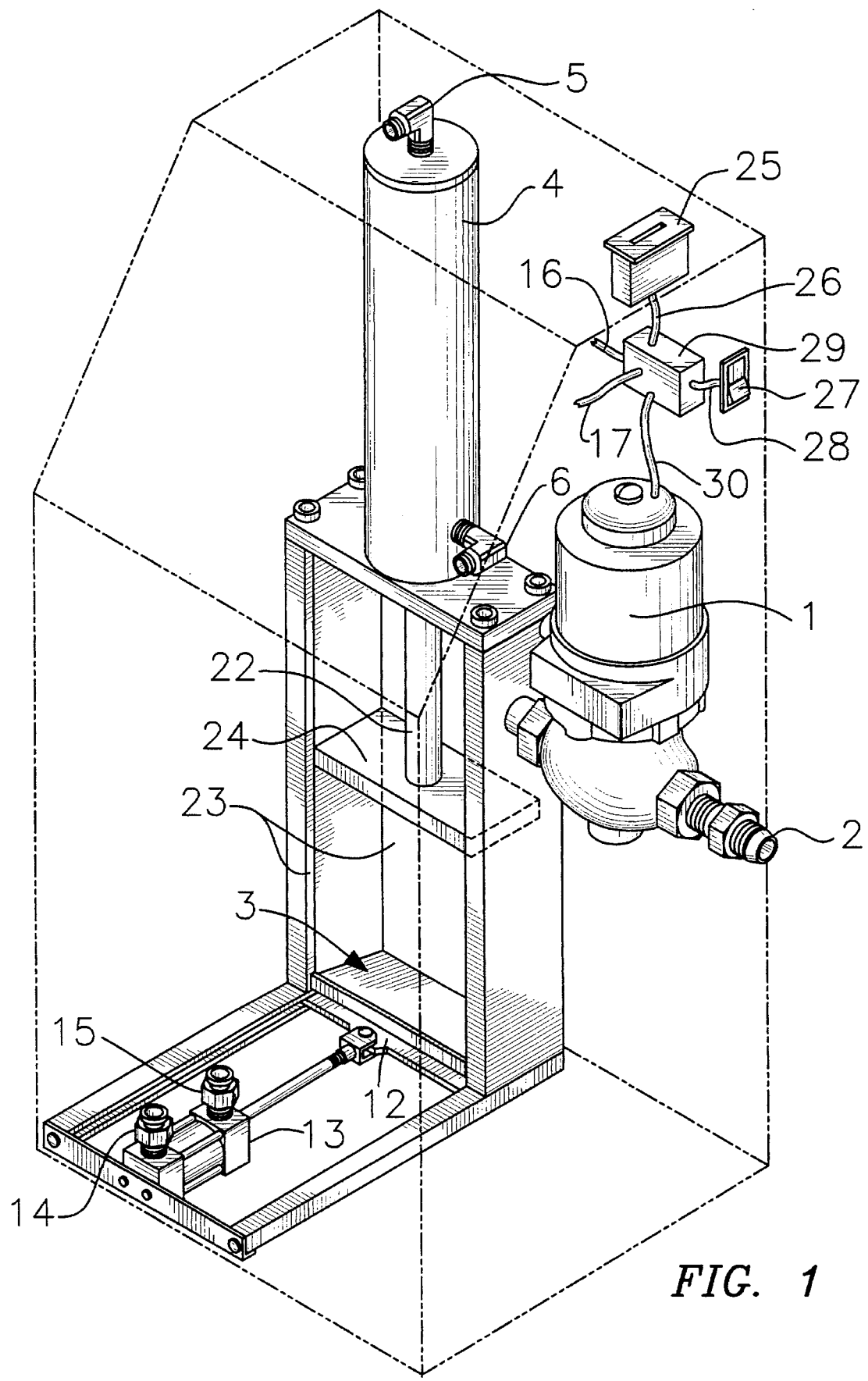
FIG. 1 is an isometric drawing of the device comprising this invention of a METHOD AND APPARATUS FOR AUTOMATICALLY PRODUCING A SMALL BLOCK OF SOLID CARBON DIOXIDE. Said drawing shows the device housed in a transparent case, where a hydraulic pump assembly, a pneumatic valve and a digital electronic controller have been omitted so as not to hide other major components comprising the remainder of the device. Major component parts are numbered for reference in the specification.
Figure 2:
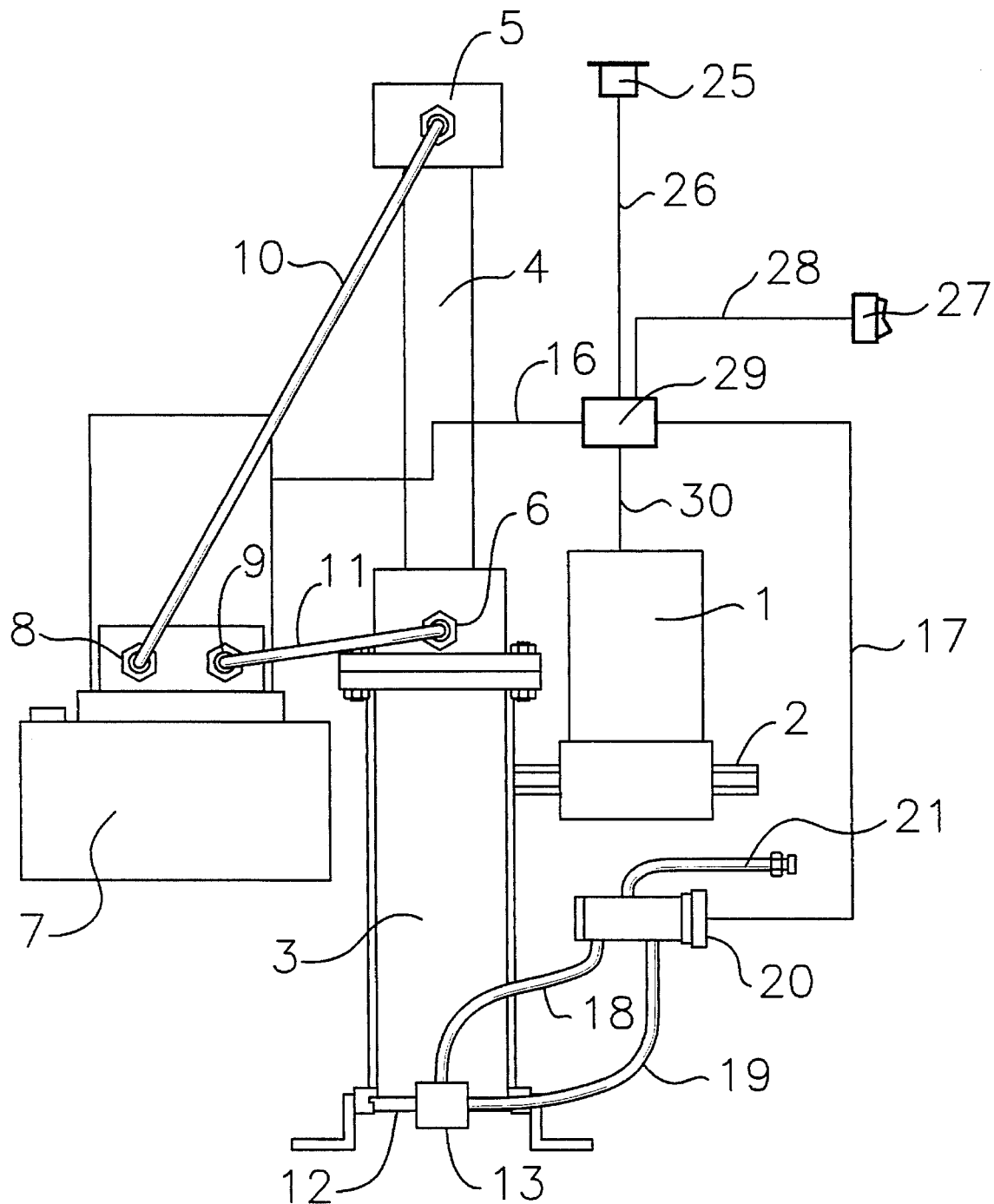
FIG. 2 is a view of the device showing the general placement of major elements and components comprising the invention.
Figure 3:
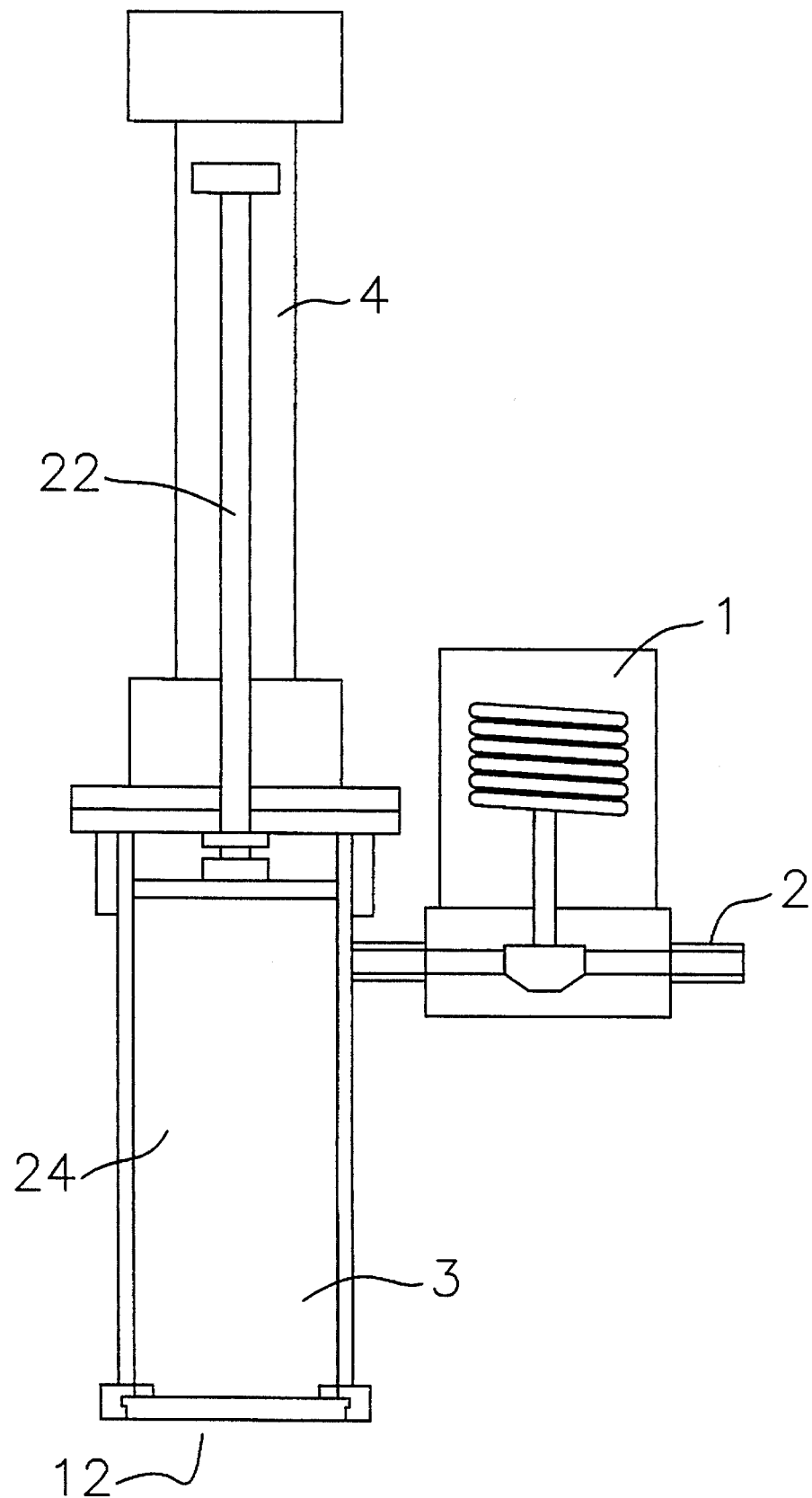
FIG. 3 illustrates the physical location of the hydraulic ram, the closed dry ice block forming chamber door, and the closed position of the electrical solenoid operated liquid fill valve just before the device is put into operation.
Figure 4:
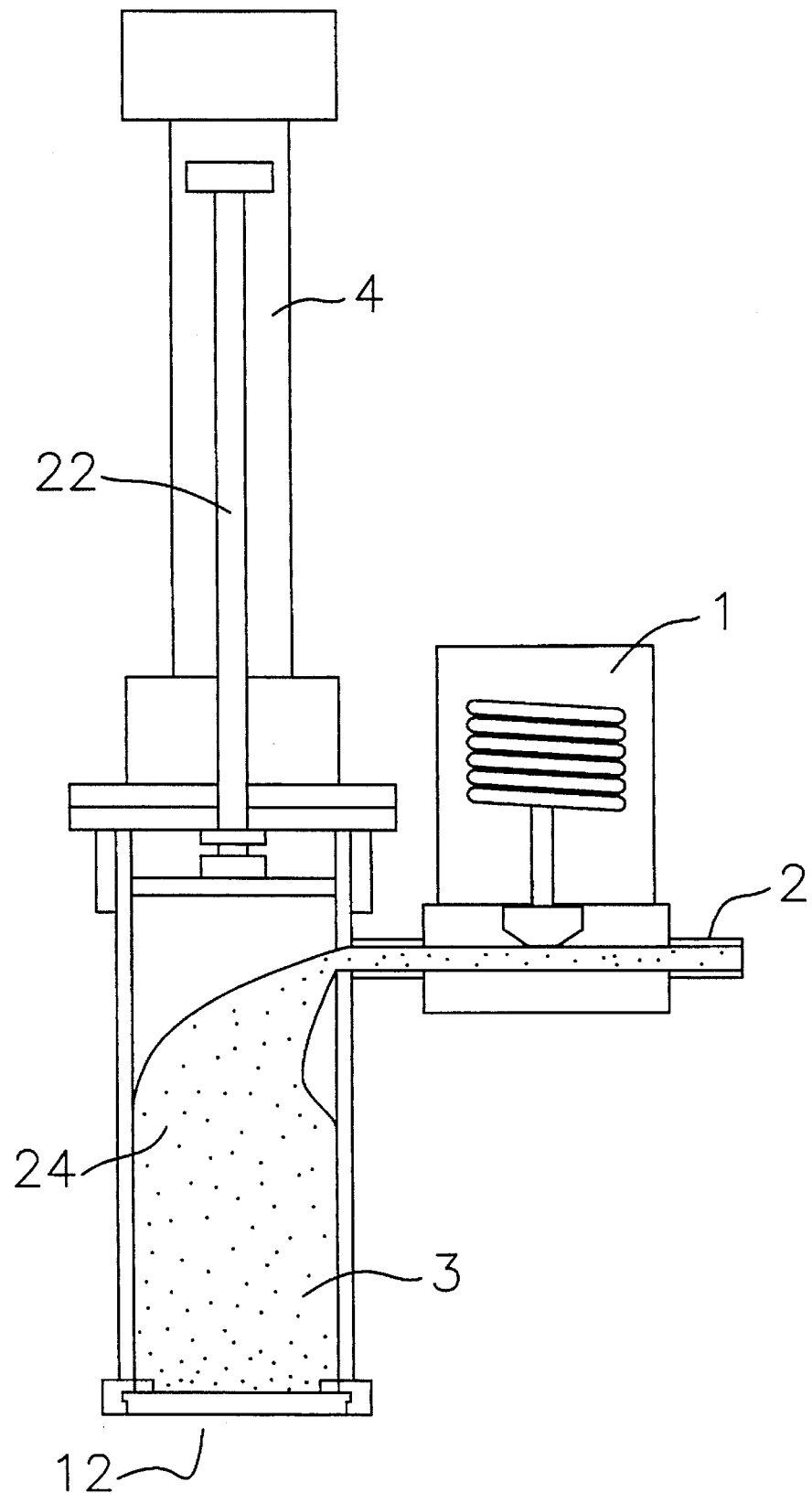
FIG. 4 shows the location of the hydraulic ram, the closed dry ice block forming chamber door, and the open position of the electrical solenoid operated liquid fill valve as the liquid carbon dioxide flows into the dry ice block forming chamber to produce a glob of low density carbon dioxide snow in said chamber.
Figure 5:
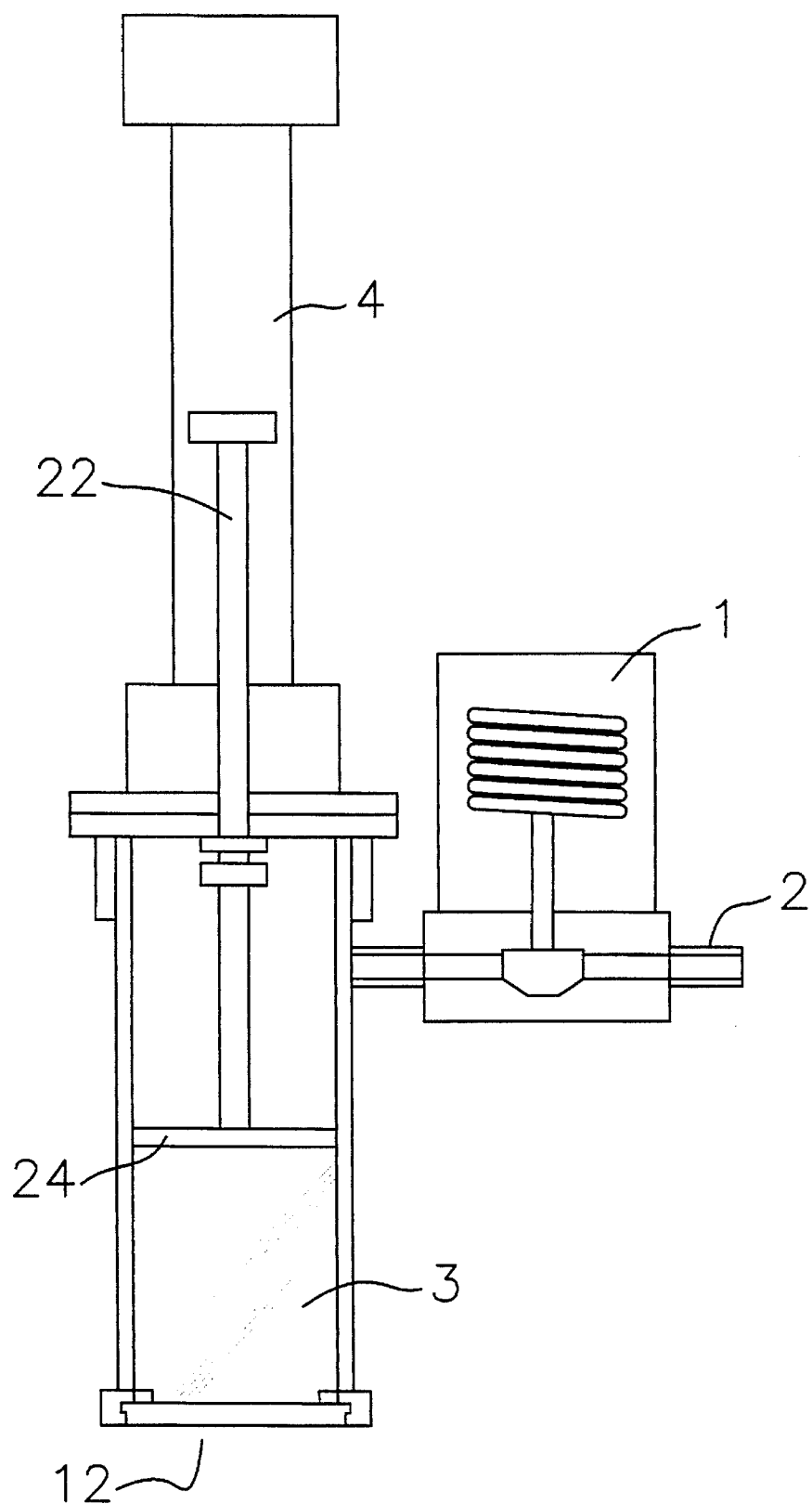
FIG. 5 illustrates the operation of the device after the electrical solenoid operated liquid fill valve has been closed and as the hydraulic ram is driven downward to compress the low density carbon dioxide snow into a small, high density, solid block of carbon dioxide.
Figure 6:
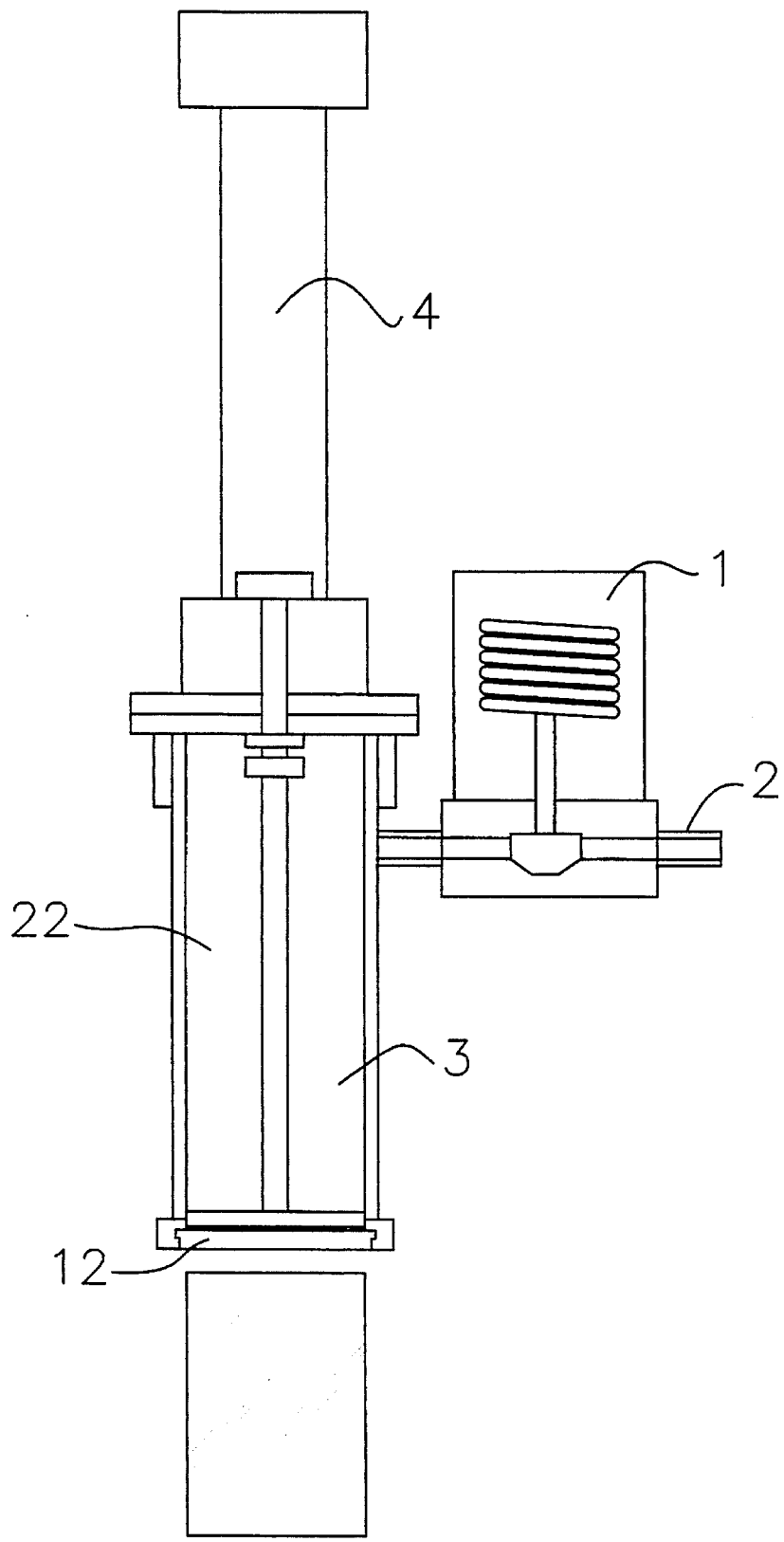
FIG. 6 shows the dry ice block forming chamber door retracted to its open position and the hydraulic ram fully extended after having expelled the small, high density, solid block of carbon dioxide.
Figure 7:
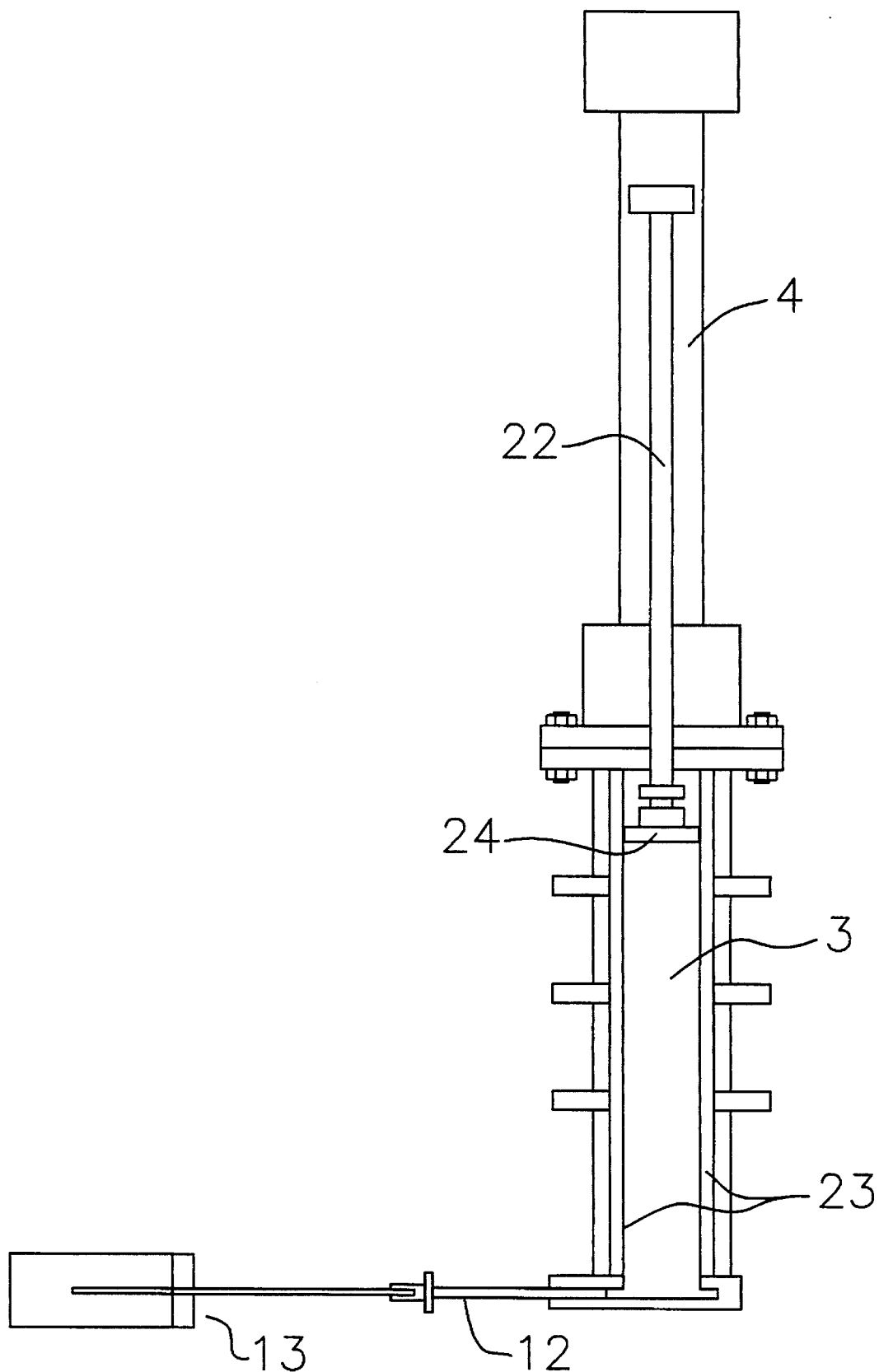
FIG. 7 is a profile view of the device which shows the porous front and back walls of the dry ice block forming chamber, the hydraulic ram, the dry ice forming chamber, the open dry ice block forming chamber door, and the pneumatically powered chamber door actuator. The side of the device is shown removed to reveal the relative positions of the major moving parts comprising the device. Shaded areas of the dry ice forming chamber show the porous material comprising or lining the front and back walls of said dry ice block forming chamber.

Referring particularly to FIG. 1, an isometric drawing and also FIGS. 2 through 7 of the complete device, illustrating the relative positions of the major component parts of this invention with the major elements and component parts numbered for reference. The input port 2 of an electrical solenoid operated liquid fill valve 1, containing a flow rate controlling orifice, is fluidly connected by a tubing conduit to the output port of a pressurized cryogenic Dewar-type tank (not shown) containing refrigerated liquefied carbon dioxide for the purpose of conducting liquefied carbon dioxide from said Dewar-type tank, through the orifice of said solenoid operated liquid fill valve 1, and into the interior of dry ice block forming chamber 3. Attached to the top of dry ice block forming chamber 3 is a hydraulic cylinder 4, ram 22, and carbon dioxide compacting plate 24. Said hydraulic cylinder 4 contains two fluid conducting ports 5 and 6. A hydraulic pump assembly 7 (shown in FIG. 2) contains two fluid conducting ports 8 and 9. Fluid conducting port 8 on the hydraulic pump assembly 7 is fluidly connected by conduit 10 (shown in FIG. 2) to fluid conducting port 5 on the hydraulic cylinder 4, and fluid conducting port 9 on the hydraulic pump assembly 7 is fluidly connected by conduit 11 (shown in FIG. 2) to fluid conducting port 6 on the hydraulic cylinder 4. Dry ice block forming chamber door 12 is located at the bottom of dry ice block forming chamber 3 and is attached to a pneumatic cylinder and ram 13. Pneumatic cylinder and ram 13 contains two fluid conducting ports 14 and 15 (shown in FIG. 1) which are fluidly connected by conduits 16 and 17, (shown in FIG. 2) respectively, to fluid conducting ports 18 and 19, (shown in FIG. 2) respectively, which are attached to electrical solenoid operated pneumatic valve 20 (shown in FIG. 2). Said electrical solenoid operated pneumatic valve 20 contains a gas input port 21 (shown in FIG. 2) which is fluidly connected to a gas phase output port on said cryogenic Dewar-type tank containing liquefied carbon dioxide. Electrical solenoid operated liquid fill valve 1, electric motor driven hydraulic pump assembly 7, and electrical solenoid operated pneumatic valve 20 (shown in FIG. 2) are all electrically connected to and controlled by a digital electronic microcontroller 29 by cables 30, 16, and 17, respectively.

In operation the system is activated when electrical power is supplied. A digital electronic microcontroller 29 is used in this system to generate the timing and control signals used to control the active components comprising the device. Said microcontroller 29 may, in turn, be activated in a vending-machine-like mode of operation by a user depositing a predetermined number of coins into a slot 25 connected to the microcontroller 29 by cable 26. Said microcontroller 29 would then turn the solenoid operated liquid fill valve 1 on and off, turns the hydraulic pump assembly 7 on and off as well as running it forward and backward, and turns the electrical solenoid operated pneumatic valve 20 on and off to open and close the dry ice block forming chamber door.

When a small block of solid carbon dioxide (dry ice) is desired, the operator deposits the correct number of coins and/or presses the start switch 27 connected to the microcontroller 29 by cable 28 to initiate the operating sequence. Before starting the operating sequence for making a block of solid carbon dioxide, the microcontroller 29 check to verify that the dry ice block forming chamber door 12 is closed, and that the hydraulic ram 22 is in its up-most positions. Should either or both of those requirements not be true, the microcontroller 29 will automatically initialize the device to meet the necessary requirements before the operating sequences are started. Once the microcontroller 29 finds that the starting position requirements are present, it will energize the liquid fill valve 1 (shown in FIG. 4) to allow the pressurized liquid carbon dioxide to enter the dry ice forming chamber 3, at a controlled flow rate, and to deposit dry ice snow in said chamber. As the low density carbon dioxide snow and gaseous carbon dioxide enters said chamber 3, the gaseous carbon dioxide will be vented to the atmosphere. This gas passes through the porous material 23 (shown in FIG. 7), forming or lining some or all of the inside surfaces of the front and back walls of the dry ice block forming chamber 3. The porous material 23 comprising said chamber 3 contains very tiny pores, 100 microns or less in diameter, which limits the rise of the gas pressure in said chamber 3 to rise during the snow making phase of the process, said rate of pressure rise being controlled by the controlled flow rate of liquid flowing through the orifice of said liquid fill valve 1. By controlling the pressure rise in said chamber 3 the pressure in the chamber 3 may be held below 70 psig pressure. Said controlled chamber pressure reduces the amount of liquid carbon dioxide which is converted to gas and lost to the atmosphere thus increasing the efficiency of the system to produce the desired carbon dioxide snow, alternatively by monitoring the liquid carbon dioxide flow rate. The microcontroller 29 allows the low density carbon dioxide snow to flow into said chamber 3 for a predetermined time and then causes the liquid fill valve 1 to close. Alternatively, the depth of snow in the dry ice block forming chamber 3 can be sensed and the flow of liquid carbon dioxide may be stopped when a predetermined amount of carbon dioxide snow has been produced.

After the dry ice block forming chamber 3 has been filled with carbon dioxide snow and the liquid fill valve 1 has been closed, the microcontroller 29 causes the hydraulic pump assembly 7 to deliver hydraulic fluid through conduit 10 to the top of the hydraulic cylinder 4 causing said hydraulic ram 22 and carbon dioxide snow compacting plate 24 (shown in FIG. 5) to move downward to compress the carbon dioxide snow between the end of said compacting plate 24 and the dry ice block forming chamber door 12 located at the bottom of said chamber 3. When said hydraulic ram 22 and compacting plate 24 have traveled a predetermined distance, the microcontroller 29 causes the hydraulic pump assembly 7 to deliver hydraulic fluid into the bottom end of said hydraulic cylinder 4, causing the ram 22 to move upward a small distance, thus relieving the pressure on the compressed block of solid carbon dioxide. Next, the microcontroller 29 energizes the solenoid operated pneumatic valve 20, connecting the pressurized carbon dioxide gas above the liquid in the Dewar-type tank and the pneumatic cylinder and ram 13, connected to the dry ice block forming chamber door 12 located at the bottom of said chamber 3. The pressurized carbon dioxide gas causes said pneumatic cylinder and ram 13 to open said door 12 at the bottom of said chamber 3. The microcontroller 29 then causes the hydraulic pump assembly 7 to again deliver hydraulic fluid to the top end of said hydraulic cylinder causing said ram 22 and compacting plate 24 to move downward to push the solid block of carbon dioxide (dry ice) from said chamber (shown in FIGS. 6 and 7) and into a catch container (not shown). When the hydraulic ram 22 and compacting plate 24 have reached the bottom of travel the microcontroller 29 reverses the hydraulic pump assembly 7 and causes hydraulic fluid to be delivered to the bottom end of said hydraulic cylinder causing said ram 22 and compacting plate 24 to move in the upward direction. When the hydraulic ram 22 and compacting plate 24 reach the up-most position (shown in FIG. 1), the microcontroller 29 turns off the hydraulic pump assembly 7 and causes the solenoid operated pneumatic valve 20 to direct pressurized carbon dioxide gas to the opposite end of the pneumatic cylinder and ram 13 to cause the dry ice block forming chamber door 12 to close. When said door is completely closed the microcontroller 29 resets itself and is ready to repeat the above described cycles upon request from an operator.

From the foregoing description of the preferred embodiment, it will be appreciated that the present invention overcomes the drawbacks of the prior art and meets the objects of the invention cited herein before. In view of the teachings of the specification, it will be apparent to those skilled in the art that many modifications, substitutions, and alterations are possible in the practice of this invention without any departure from the scope and spirit of this invention.

We claim:

1. A dry ice maker comprising:

a chamber having a first end, a second end, and side walls between said first end and said second end, an area of porous material disposed along at least one of said side walls substantially closer to said first end than to said second end, and a carbon dioxide liquid orifice allowing liquid carbon dioxide into said chamber, such that said liquid carbon dioxide separates into carbon dioxide gas and carbon dioxide snow, whereby said carbon dioxide gas vents through said porous material; and a ram moving from said first end to said second end for compressing said carbon dioxide snow into a block of dry ice.

2. The dry ice maker of claim 1 wherein:

said porous wall material comprises pores of not more than 100 microns.

* * * * *